US012613896B2

(12) United States Patent
Lowski et al.

(10) Patent No.: US 12,613,896 B2
(45) Date of Patent: Apr. 28, 2026

(54) SYSTEMS AND METHODS FOR PROVIDING RECOMMENDATIONS TO CLOUD SERVICE REQUESTS

(71) Applicant: SAP SE, Walldorf (DE)

(72) Inventors: Robert Lowski, Senftenberg (DE); Florian Fricke, Dresden (DE); Varsha Shetty, Leimen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/902,392

(22) Filed: Sep. 30, 2024

(65) Prior Publication Data

US 2026/0093740 A1 Apr. 2, 2026

(51) Int. Cl.
*G06F 16/30* (2019.01)
*G06F 16/334* (2025.01)
*G06F 16/383* (2019.01)

(52) U.S. Cl.
CPC ........ *G06F 16/3347* (2019.01); *G06F 16/383* (2019.01)

(58) Field of Classification Search
CPC . G06F 16/3347; G06F 16/3323; G06F 16/383
See application file for complete search history.

(56) References Cited

U.S. PATENT DOCUMENTS

| | | | | |
|---|---|---|---|---|
| 2003/0172133 A1* | 9/2003 | Smith | ..................... | G06Q 30/02 709/219 |
| 2011/0161479 A1* | 6/2011 | Freishtat | ................. | G06F 21/44 709/223 |
| 2017/0286970 A1* | 10/2017 | Pelletier | ............... | G06Q 30/016 |
| 2017/0330195 A1* | 11/2017 | Lange | ................. | G06F 3/04817 |
| 2021/0209300 A1* | 7/2021 | Kumar | .................. | G06F 40/205 |
| 2022/0101148 A1* | 3/2022 | Lin | ......................... | G06N 20/20 |
| 2024/0403339 A1* | 12/2024 | Azizi | ...................... | G06F 40/30 |
| 2025/0111152 A1* | 4/2025 | Sinha | .................... | G06F 40/205 |

OTHER PUBLICATIONS

Article entitled "StartupYard and GoodData Partner to Provide Data Platform to European Startups", by StartupYard, dated Jan. 8, 2014 (Year: 2014).*
Article entitled "The seamless ticketing support journey between SAP Commerce Cloud and SAP Service Cloud", by Monteiro, dated Jan. 12, 2023 (Year: 2023).*

* cited by examiner

*Primary Examiner* — Mahesh H Dwivedi
(74) *Attorney, Agent, or Firm* — Fountainhead Law Group, PC

(57) ABSTRACT

Described herein are techniques for processing cloud service requests. Cloud service providers may allow users to submit service requests to perform functions on the cloud. Most service requests may be based on service request templates available in a service catalog. However, users may be unable to find what they would like to do in the service catalog and therefore may submit an assisted service request that includes text description of what the user is trying to do. These assisted service requests may be analyzed and recommended service request templates may be provided from the service catalog.

20 Claims, 11 Drawing Sheets

500

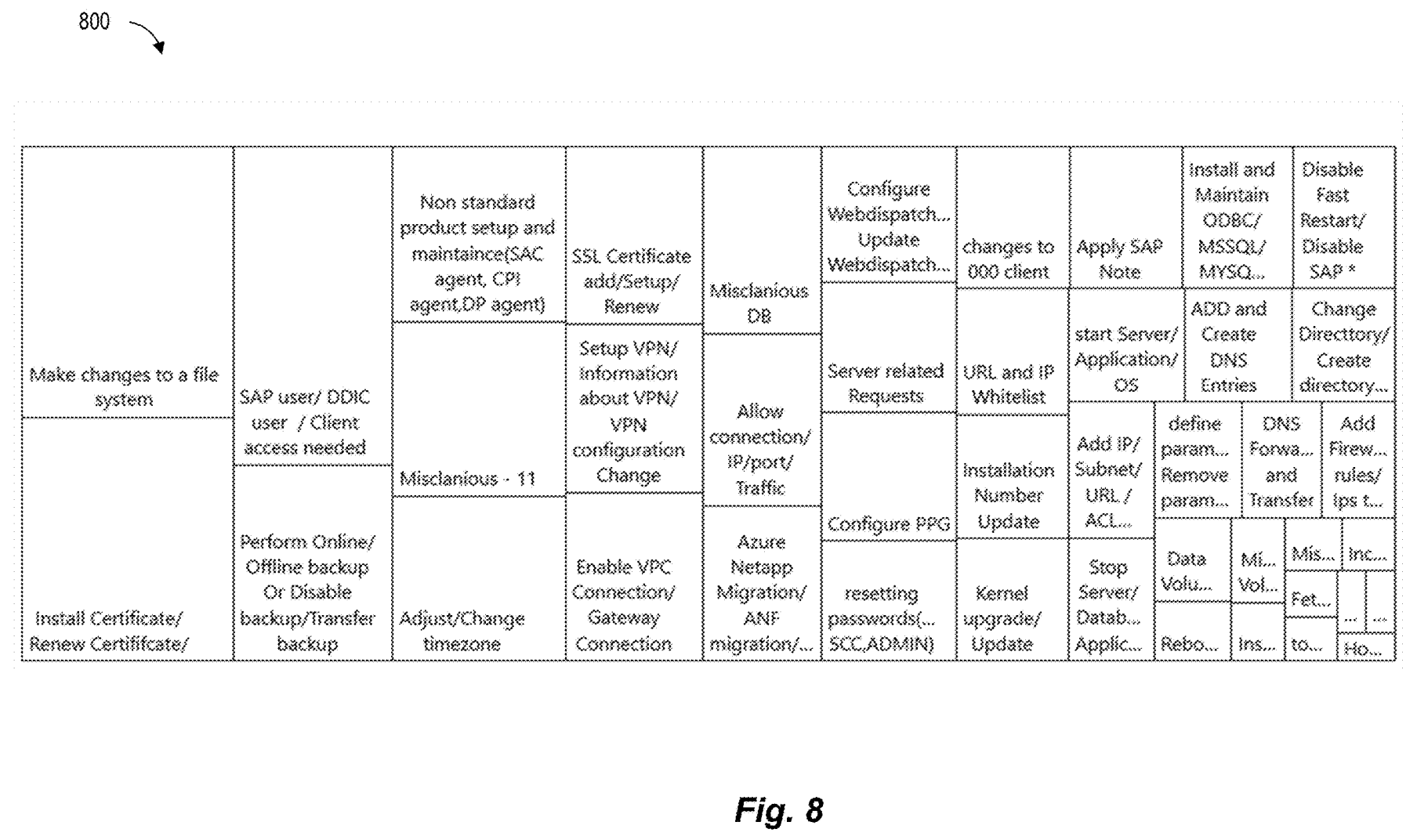

800

- Disable Fast Restart/ Disable SAP *
- Install and Maintain ODBC/ MSSQL/ MYSQ...
- Change Directory/ Create directory...
- ADD and Create DNS Entries
- Add Firew... rules/ ips t...
- DNS Forwa... and Transfer
- define param... Remove param...
- Mis... Inc...
- Fet...
- Ho...
- M... Vol...
- Data Vol...
- Ins...
- Rebo...
- Apply SAP Note
- start Server/ Application/ OS
- Add IP/ Subnet/ URL/ ACL...
- Stop Server/ Datab... Applic...
- changes to 000 client
- URL and IP Whitelist
- Installation Number Update
- Kernel upgrade/ Update
- Configure Webdispatch... Update Webdispatch...
- Server related Requests
- Configure PPG
- resetting passwords(... SCC,ADMIN)
- Miscelanious DB
- Allow connection/ IP/port/ Traffic
- Azure Netapp Migration/ ANF migration/...
- SSL Certificate add/Setup/ Renew
- Setup VPN/ information about VPN/ VPN configuration Change
- Enable VPC Connection/ Gateway Connection
- Non standard product setup and maintaince(SAC agent, CP) agent,DP agent)
- Miscelanious - 11
- Adjust/Change timezone
- SAP user/ ODIC user / Client access needed
- Perform Online/ Offline backup Or Disable backup/Transfer backup
- Make changes to a file system
- Install Certificate/ Renew Certificate/

*Fig. 8*

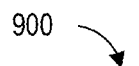

900

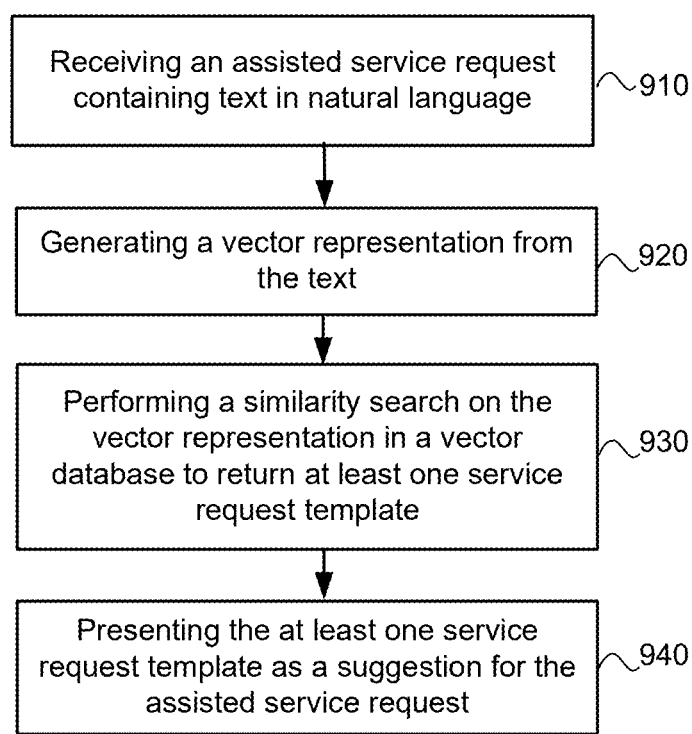

Receiving an assisted service request containing text in natural language    910

Generating a vector representation from the text    920

Performing a similarity search on the vector representation in a vector database to return at least one service request template    930

Presenting the at least one service request template as a suggestion for the assisted service request    940

*Fig. 9*

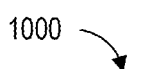
1000
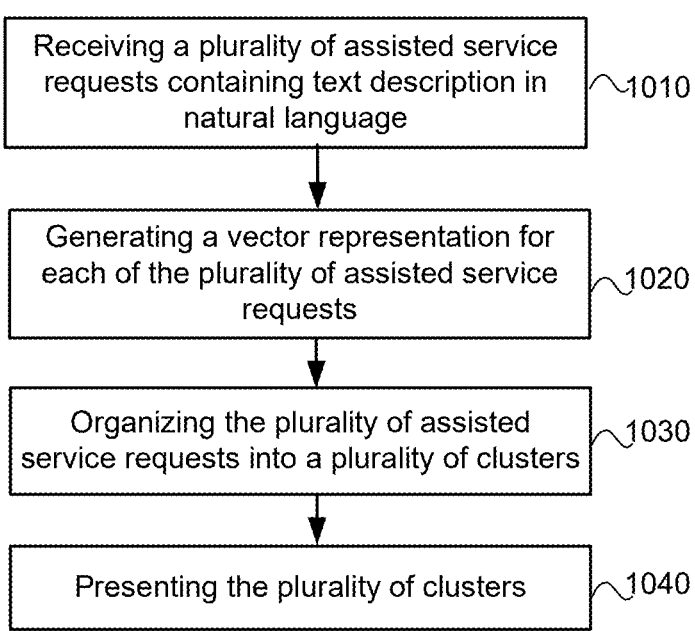
| Receiving a plurality of assisted service requests containing text description in natural language | 1010 |
| Generating a vector representation for each of the plurality of assisted service requests | 1020 |
| Organizing the plurality of assisted service requests into a plurality of clusters | 1030 |
| Presenting the plurality of clusters | 1040 |
*Fig. 10*

SYSTEMS AND METHODS FOR PROVIDING RECOMMENDATIONS TO CLOUD SERVICE REQUESTS

BACKGROUND

Unless otherwise indicated herein, the approaches described in this section are not prior art to the claims in this application and are not admitted to be prior art by inclusion in this section.

Cloud services are services offered by a cloud service provider to customers. These cloud services allow a customer to host their applications and systems on the cloud, thereby freeing up their local resources. A customer may request cloud services from the service provider by submitting a service request. Service requests that are in the service provider's service catalog can generally be processed efficiently, sometimes automatically. However, customers may also submit custom service requests, also known as assisted service requests. Assisted service request generally require manual intervention and therefore require more time and effort to address when compared to which substantially increases the time and effort to address when compared to service requests from the service catalog. Thus, there is a need to improve the efficiency of processing assisted service requests.

BRIEF DESCRIPTION OF THE DRAWINGS

FIG. 8 illustrates a dashboard illustrating a visual representation of clusters according to some embodiments.

FIG. 9 illustrates a workflow for providing service request template recommendations according to some embodiments.

FIG. 10 illustrates a workflow for clustering assisted service requests according to some embodiments.

DETAILED DESCRIPTION

Figure 1:
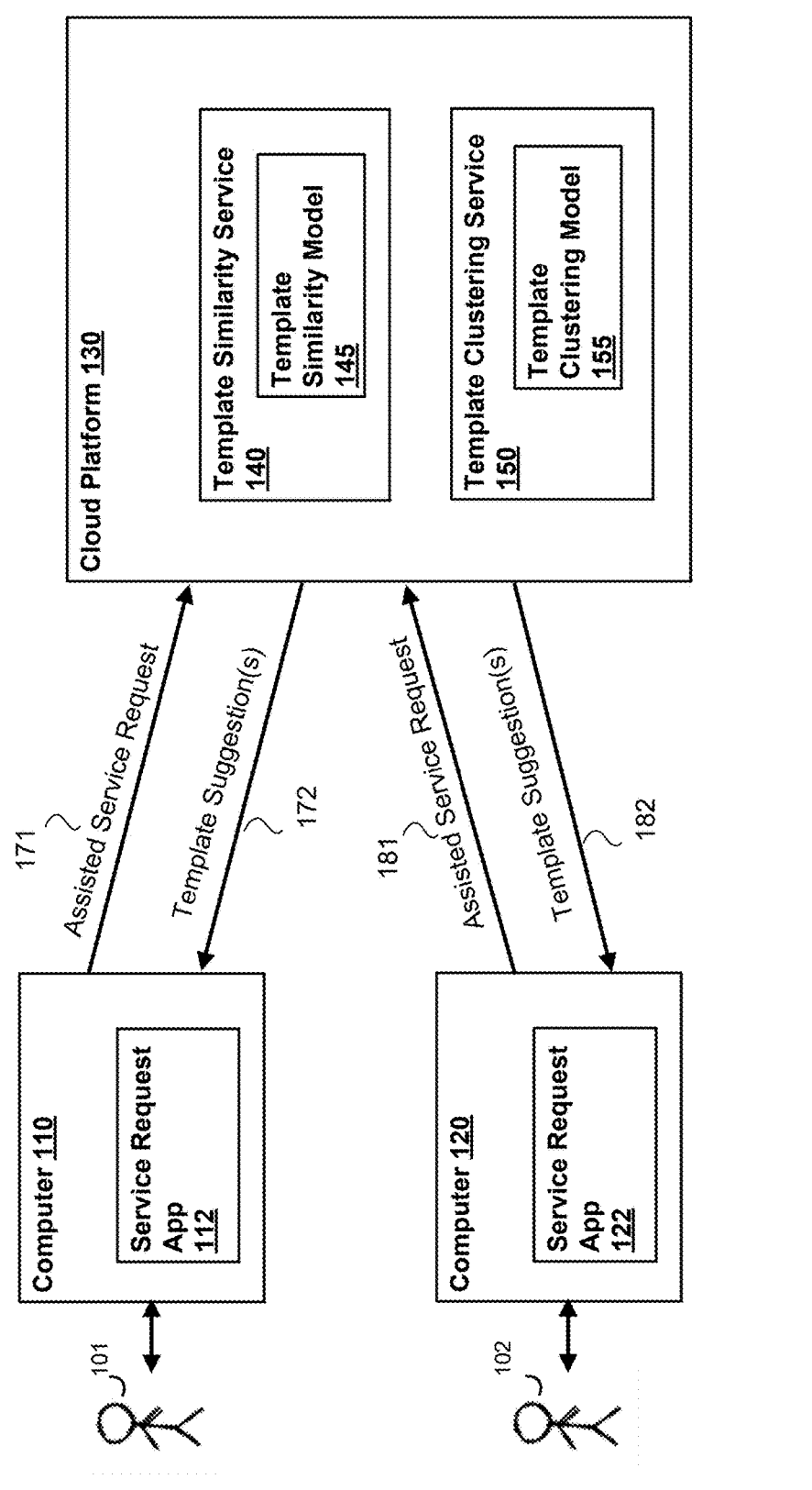
FIG. 1 illustrates a system for processing cloud service requests according to some embodiments.

Described herein are cloud service solutions, more particularly methods and apparatuses to manage assisted service requests received from customers of a cloud service provider. Customers of a cloud service provider may request cloud services to manage their hosted systems and applications by submitting a service request. These services encompass tasks such as applying the latest security patch or restarting a system. Service request come in two flavors- normal service requests and assisted service requests. Normal service requests are service requests based on service request templates from a service catalog containing cloud services offered by the service provider. A customer may fill out the service request template and submit the completed service request template as part of a service request. In one embodiment, the majority or all of these service requests are processed automatically. Assisted service requests are service requests are customized service request where the customer describes their unique requirements in natural language text. Assisted service requests may require manual intervention for processing, which substantially increases the workload for the service provider. For example, an employee of the service provider may communicate with the customer via email or the phone to get more information about the request and troubleshoot. On average, an employee may spend 2.5 workdays to resolve an assisted service request, thus extending the average resolution of an assisted service request to over 20 days.

In some instances, a customer may mistakenly submit an assisted service request when the desired service exists in the service catalog. This may occur for a number of reasons. For example, a new customer be unfamiliar with how to search the service catalog for the desired service. As another example, the service catalog may have received new service request templates during a recent update and the customer is unaware of the new service requests supported by the service provider. Described herein are solutions that leverage machine learning models to recommend or suggest service requests in a service catalog that may satisfy a customer's assisted service request. A template similarity model may be generated from service request templates in the service catalog. The template similarity model may in turn be utilized by receiving assisted service requests and generating output contains service request templates from the service catalog that serve as suggestions or recommendations for the customer to consider using. A customer may find this useful as it helps locate service requests available in the service catalog that may satisfy the customer's request. Having the customer utilize service request templates from the service catalog is advantageous because the service provider understands how to handle service request from the service catalog and therefore, can minimize the manual intervention from assisted service requests. Described herein are also solutions to analyze the assisted service requests received so that the service provider can identify new services to create to enrich the service catalog. In one embodiment, the assisted service requests can be analyzed and organized into a plurality of clusters based on similarity. Organizing the assisted service into clusters may be advantageous because the service provider may review the clusters when deciding which new service requests to create for the service catalog. In one example, a service provider may prioritize clusters containing more assisted service requests when creating new service requests over clusters containing fewer assisted service requests since the newly created service request would be able to service a larger number of customer's needs.

FIG. 1 illustrates a system for processing cloud service requests according to some embodiments. System 100 includes users 101 and 102 who are customers of a cloud service provider. Users 101 and 102 may submit assisted service requests to the cloud service provider. An assisted service request is a service request that is not based on a service request template available in a service catalog. In one example, the user describes their request using text in natural language in the assisted service request. An example of an assisted service request is provided in FIG. 5. As shown here, user 101 submits an assisted service request 171 to cloud platform 130 through service request application 112 running on computer 110. Similarly, user 102 submits assisted service request 181 to cloud platform 130 through service request application 122 running on computer 120. The service request application may be an application created by the cloud service provider so that users may request cloud services. In other embodiments, more or fewer users may submit assisted service requests to cloud platform 130.

Cloud platform 130 may be operated by the service provider. Cloud platform 130 includes template similarity service 140. Template similarity service 140 is configured to identify service requests from the service catalog that are similar to the assisted service request and as a result, may possibly be used to satisfy the assisted service request. If template similarity service 140 is able to identify one or more service requests from the service catalog that are similar to the assisted service request, these identified service requests may be returned to the user as recommendations or suggestions. For example, template suggestion(s) 172 is transmitted to computer 110 in response to assisted service request 171 and template suggestion(s) 182 is transmitted to computer 120 in response to assisted service request 181. In some embodiments when more than one template suggestion, the template suggestions may be ranked based on their similarity to the assisted service request. For example, each service request template suggested may have a similarity score that represents how similar the service request template is to the assisted service request. Template similarity service 140 may utilize template similarity model 145 to identify the one or more service request templates. In one embodiment, template similarity model 145 may be trained using the service request templates in a service catalog that contains the services or service templates supported by the service provider. In one embodiment, template similarity model 145 may be a vector database.

Cloud platform 130 may further include template clustering service 150. Template clustering service 150 is configured to organize assisted service requests received from users into one or more clusters. The service provider in turn may use the clusters to select service request templates to develop and add to the service catalog. In one embodiment, all assisted service requests received by cloud platform 130 in a predetermined period of time are clustered. In another embodiment, template clustering service 150 and template similarity service 140 may together process incoming assisted service requests. For example, template similarity service 140 may attempt to provide suggestions of service requests from the service catalog that may satisfy the user's assisted service request. If the user finds none of the suggestions acceptable or if no suggestions are provided, then the assisted service request is passed to the template clustering service 150. Template clustering service 150 may store the assisted service request along with other assisted service requests that were not addressed by a service request from the service catalog. Once a triggering event has occurred, template clustering service 150 may process the stored assisted service requests to generate clusters, where each cluster contains one or more of the stored assisted service requests. Clusters having more assisted service requests may be prioritized during development of new service requests to add to the service catalog. In one embodiment, the triggering event may be that a predetermined period of time has passed (e.g., a month, a company quarter, a calendar year). In another embodiment, the triggering event may be a manual request by the service provider or other party to cluster the stored assisted service requests.

Cloud platform 130 may provide the clustered assisted service requests to the service provider who in turn may make business decisions based on the clusters. The business decisions include deciding which clusters to implement as new service request template(s). New service request template(s) may in turn be added to the service catalog.

Figure 2:
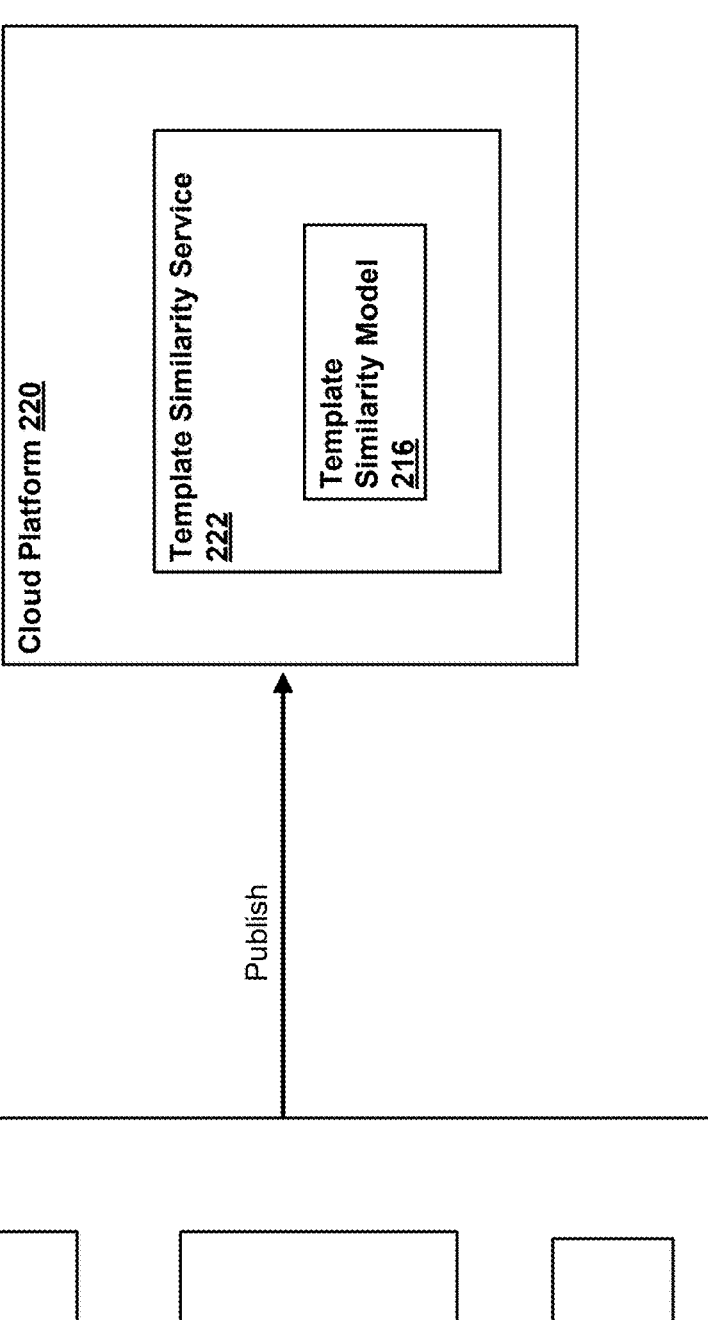
FIG. 2 illustrates a system for generating a template similarity model according to some embodiments.

FIG. 2 illustrates a system for generating a template similarity model according to some embodiments. As shown, system 200 includes service provider 210 and cloud platform 220. Service provider 210 may store service request templates 212. In one embodiment, service request templates 212 may represent the services supported by the service provider, which may be shared with users through a service catalog. In other words, the service catalog may include a details of the service request templates 212. A user may select a service request template from the service catalog when requesting service from the service provider. Service provider 210 further includes model trainer 214. Model trainer 214 may be configured to train template similarity model 216 with service request templates 212. Once trained, template similarity model 216 may be configured to receive an assisted service request and return service request templates that may be similar to the assisted service request.

Service provider 210 may publish template similarity model 216 to cloud platform 220. Cloud platform 220 may include template similarity service 222 which may utilize the published template similarity model 216 to generate recommendations or suggestions in response to an assisted service request. The assisted service request may come from a user that is receiving services from the service provider. The recommendations or suggestions generated may include one or more service request templates from the service catalog. The number of service request templates from the service catalog may depend on the number of service request templates in the service catalog that are similar to the assisted service request. Advantages of providing service request templates in response to a user's assisted service request are that the user may decide to select and use one of the service request templates, therefore eliminating the need of the assisted service request. If the selected service request template is automated by the service provider, then time and effort may be saved from having the user use a service request template from the service catalog over an assisted service request which requires human intervention.

Figure 3:
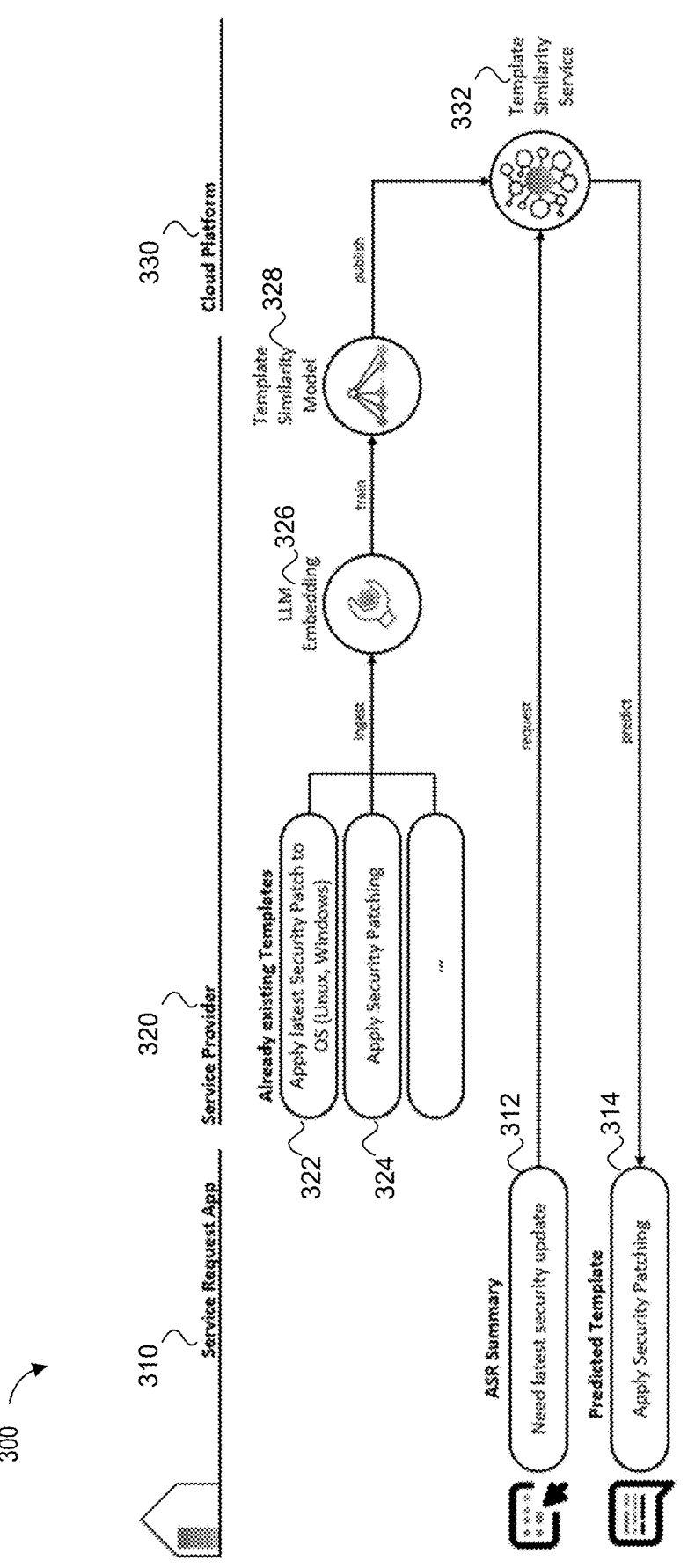
FIG. 3 illustrates a workflow for providing service request template recommendations according to some embodiments.

FIG. 3 illustrates a workflow for providing service request template recommendations according to some embodiments. As shown, workflow 300 includes three parties-service request application 310, service provider 320, and cloud platform 330. Service provider 320 includes a plurality of existing templates (i.e., service request templates). The existing templates may be shared with users as part of a service catalog. Here, existing templates include template 322 (Apply latest security patch to OS) and template 324 (Apply security patching). Service provider 320 may apply an LLM embedding to transform the existing templates into multi-dimensional vectors. The text and/or data in each existing template may be represented as a multi-dimensional vector through LLM embedding. In one embodiment, the LLM embedding is applied to the title of the existing template. For example, LLM embedding may be applied to the text "Apply security patching" of template 324. In another embodiment, the LLM embedding is applied to the detailed description of the existing template. For example, template 324 may include one or more paragraphs of text describing the functionality of template 324. In yet other examples, LLM embedding can be applied to a concatenation of data from an existing template, such as a concatenation of the title and the description. In yet other examples, tags and keywords associated with the existing template may also be used in the creation of the embedding.

Once each of the existing templates have been transformed into a multi-dimensional vector, service provider 320 may utilize the multi-dimensional vectors to train template similarity model 328. Template similarity model 328 may be trained to receive text from an assisted service request and return one or more existing templates that are similar to the assisted service request. Once the template similarity model has been trained, service provider 320 publishes the template similarity model to cloud platform 330. Cloud platform 330 includes template similarity service 332. Service request application 310 may transmit a text summary of assisted service request 312 ("Need latest security update") to template similarity service 332. Template similarity service 332 may convert the text summary into a multi-dimensional vector representation and then input the multi-dimensional vector representation into published template similarity model 328. In one example, the vector representation is generated by applying a word embedding. The word embedding may be applied to the title of assisted service request 312, the description of assisted service request 312, tags or keywords associated with the assisted service request 312, or a concatenation of multiple data fields from the assisted service request 312. In one embodiment, the conversion may be through the same LLM embedding or word embedding used to embed the existing templates. Template similarity model 328 may process the input and generate output that identifies one or more existing templates that are similar to the text summary. In one embodiment, template similarity model may return one or more unique identifiers, where each unique identifier corresponds to an existing service request template in the service catalog. Cloud platform can in turn access the service catalog to retrieve the service request template. In one example, the unique identifier may be the combination of an identifier and the template name. In other examples, the unique identifier may simply be an alphanumeric value. In one example, template similarity model 328 may identify other multi-dimensional vectors representing existing templates that are similar to the multi-dimensional vector representing the assisted service request. Here, template similarity service 322 may identify template 324 as being similar to the text in the assisted service request and return template 324 as predicted template 314 to service request application 310. In one embodiment, template similarity service 322 may return a unique identifier that corresponds to template 324 to service request application 310. Service request application 310 may in turn look up the unique identifier to retrieve information about existing template 324 to present to the user as a suggested service request template to use instead of continuing with the assisted service request. If the user selects the suggested service request template, then the assisted service request is completed. Alternatively, if the user does not select the suggested service request(s), then the assisted service request is not completed, and manual intervention may be required.

Figure 4:
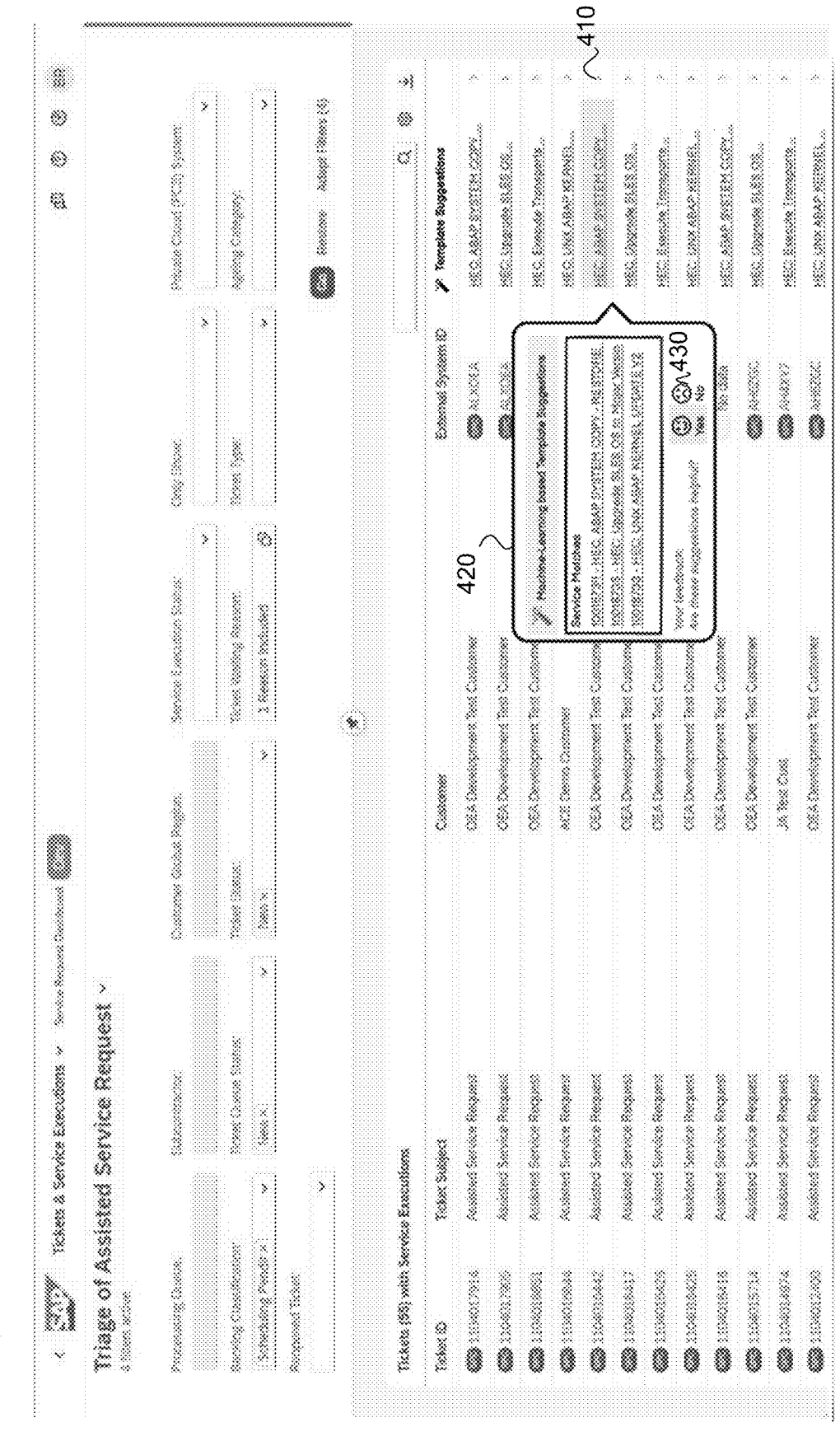
FIG. 4 illustrates a screenshot of a service request dashboard according to some embodiments.

FIG. 4 illustrates a screenshot of a service request dashboard according to some embodiments. As shown, screenshot 400 contains a dashboard that includes a list of outstanding assisted service requests. The first column contains the ticket ID for each assisted service request while the second column contains the ticket subject which is "Assisted Service Request." The third column contains the customer's name, and the fourth column contains the external system ID. The fifth column contains template suggestions provided by the template similarity service. For example, template suggestion 410 may be recommended to the user as an existing template that may be able to resolve the assisted service request with ticket ID 1104016844. Template selection 410 may be a selectable link (i.e., selected by hovering over, clicking, etc.) which when selected, may result in pop up window 420 being presented. Pop up window 420 includes a plurality of service request templates that may be a match for the assisted service request. As shown, template suggestion 410 may present the top rated service request template suggestion while pop-up window 420 may present a list of other service request template suggestions, which includes the top rated one listed first. Icon 430 may be presented in pop up window 420 so that the user may provide feedback about the quality of the suggestions. The user feedback may be used to adjust the weights in the template similarity model so that helpful suggestions occur more frequently, and unhelpful suggestions occur less often.

Figure 5:
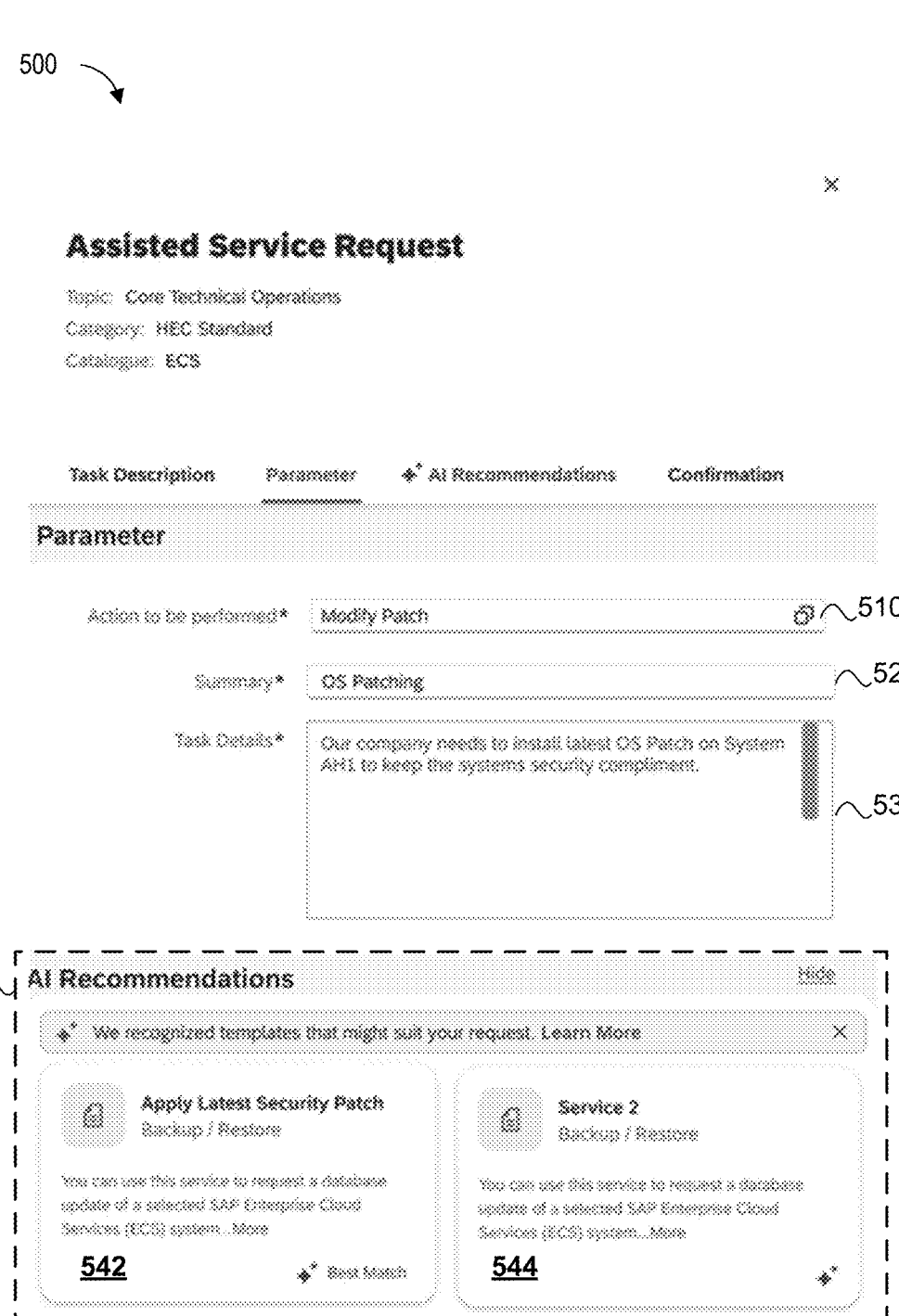
FIG. 5 illustrates a screenshot of an assisted service request window according to some embodiments.

FIG. 5 illustrates a screenshot of an assisted service request window according to some embodiments. Window 500 is a graphical user interface that can receive input parameters from the user to define the assisted service request. As shown, window 500 contains fields 510, 520, and 530 where a user may describe the assisted service request. Fields 510, 520, and 530 can be text fields or a pull down menu with options that the user may select from. Window 500 further includes AI Recommendations section 540 where templates similar to the assisted service request may be presented to the user. As shown here, service request template 542 and service request template 544 are being presented as recommended service request templates that might suit the user's assisted service request. Service request template 542 includes a descriptor identifying it as the best match (i.e., service request template with the highest similarity score). More or less information on the service request templates may be presented based on implementation details. In one embodiment, the text in field 530 may be transmitted to a cloud platform where the text is converted into a multi-dimensional vector and provided as input to the template similarity model to identify existing templates that are similar to the text in field 530. In other embodiments, a combination of fields 510, 520, and 530 may be used to generate the multi-dimensional vector. In one embodiment, service request templates 542 and 544 are selectable where selecting a service request template results in presenting the graphical user interface that is associated with the selected service request template. For example, if service request template 542 is selected, a graphical user interface may be presented to the user for initiating the application of the latest security patch.

Figure 6:
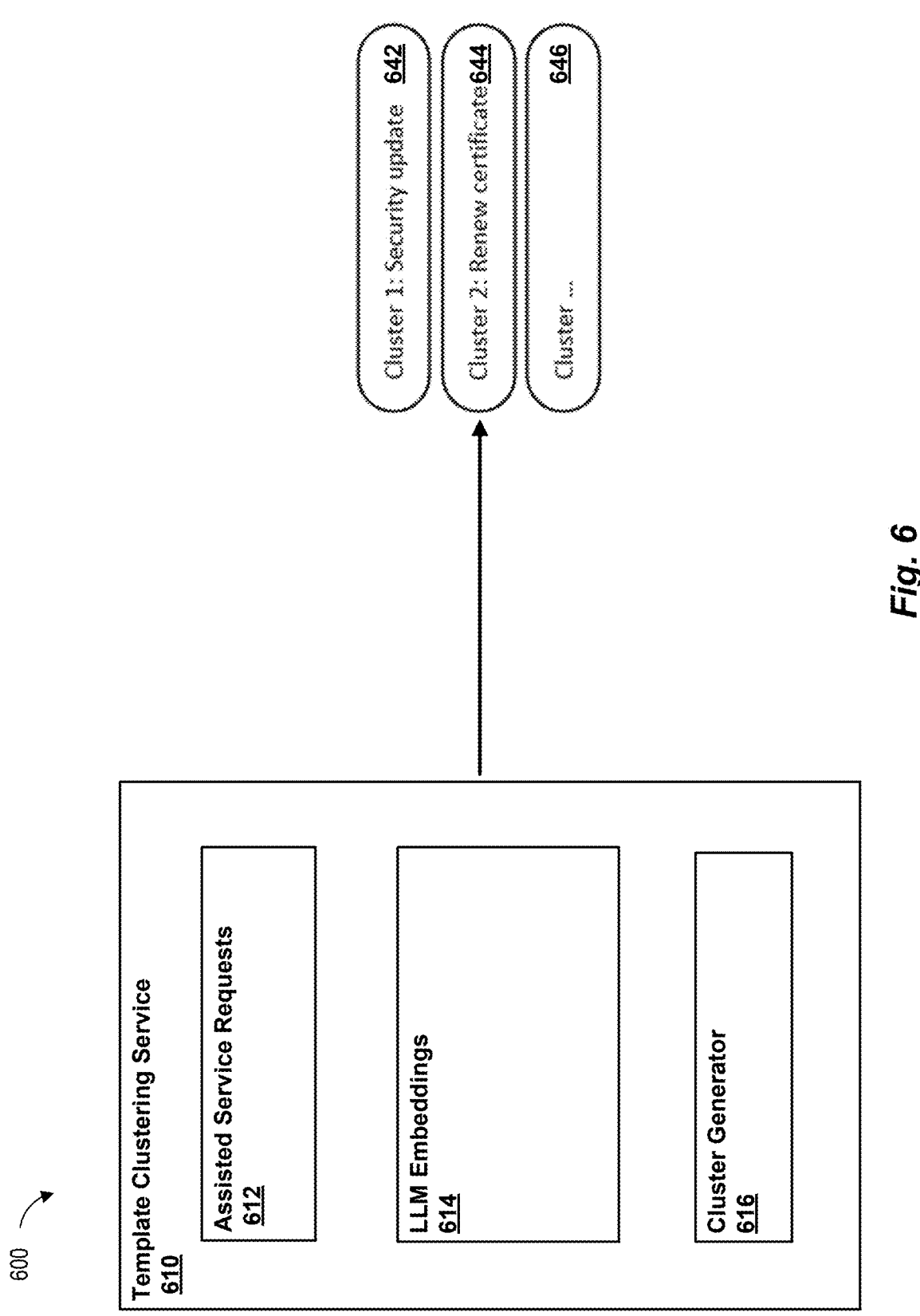
FIG. 6 illustrates a system for organizing assisted service requests into clusters according to some embodiments.

FIG. 6 illustrates a system for organizing assisted service requests into clusters according to some embodiments. Assisted service requests received may be organized into clusters to help prioritize the development of future service request templates. For example, if one cluster contains 30 assisted service requests while a second cluster contains only 3 assisted service requests, developing a new service request template that can address the first cluster of 30 may take priority over developing a new service request template to address the second cluster of 3. In one embodiment, assisted service requests that require manual intervention are considered for clustering. An assisted service request may require manual intervention if no service template request suggestions were provided or none of the provided template service request suggestions were suitable for the user's assisted service request.

System 600 includes template clustering service 610. Template clustering service 610 is configured to analyze assisted service requests and generate clusters of assisted service requests. In other words, template clustering service may organize assisted service request into clusters. Template clustering service 610 includes assisted service requests 612, LLM embeddings 614, and cluster generator 616. In one embodiment, assisted service requests 612 may include assisted service requests that require manual intervention. Manual intervention may be an employee of the software provider contacting the user to learn more about the assisted service request and ultimately manually perform one or more actions to address the user's assisted service request. This is in contrast to service requests in a service catalog that can be automatically processed. Identifying and prioritizing the development of new service request templates may be useful to the service provider since the newly developed service request templates can automatically handle service requests, thus freeing up time from employees to preform other tasks. Through clustering, the service provider can quickly visually review similarities between assisted service requests that have not been resolved and quickly decide on which new service request templates to develop for the current service catalog. In another embodiment, assisted service requests 612 may include all assisted service requests received. This may be useful to identify existing service request templates that need more visibility since users are submitting assisted service requests rather than selecting the existing service request from the catalog.

Assisted service requests 612 may be received by LLM embeddings 614. LLM embeddings 614 may process each assisted service request to generate a multi-dimensional vector representation of the assisted service request. In one embodiment, the text describing the assisted service request (for example, the text in field 530 of FIG. 5) may be used to generate the multi-dimensional vector. In some implementations where service request template recommendations are provided prior to clustering, the multi-dimensional vector representation corresponding to the assisted service requests may have been previously generated during the template recommendation analysis and therefore do not need to be regenerated. Once a multi-dimensional vector corresponding to each assisted service request is available (either generated now or previously generated in the workflow), cluster generator 616 may analyze the multi-dimensional vectors to generate clusters. In one embodiment, cluster generator 616 may organize the multi-dimensional vectors into clusters. Assisted service requests that correspond to the multi-dimensional vectors in a cluster are said to belong to the same cluster. In one embodiment, k-means clustering may be applied to create clusters from the multi-dimensional vectors. In other embodiments, different similarity algorithms may be applied to create clusters that have similar requirements. Here, clusters 642, 644, and 646 have been generated from cluster generator 616. The clusters may in turn be visualized or shared with the service provider. This may be advantageous as it allows the team to identify common customer requirements. By analyzing these clusters, new service request templates may be derived to enrich the service catalog, thereby reducing the volume of assisted service requests that require manual intervention, thus improving processing time and the overall efficiency of the cloud business.

Figure 7:
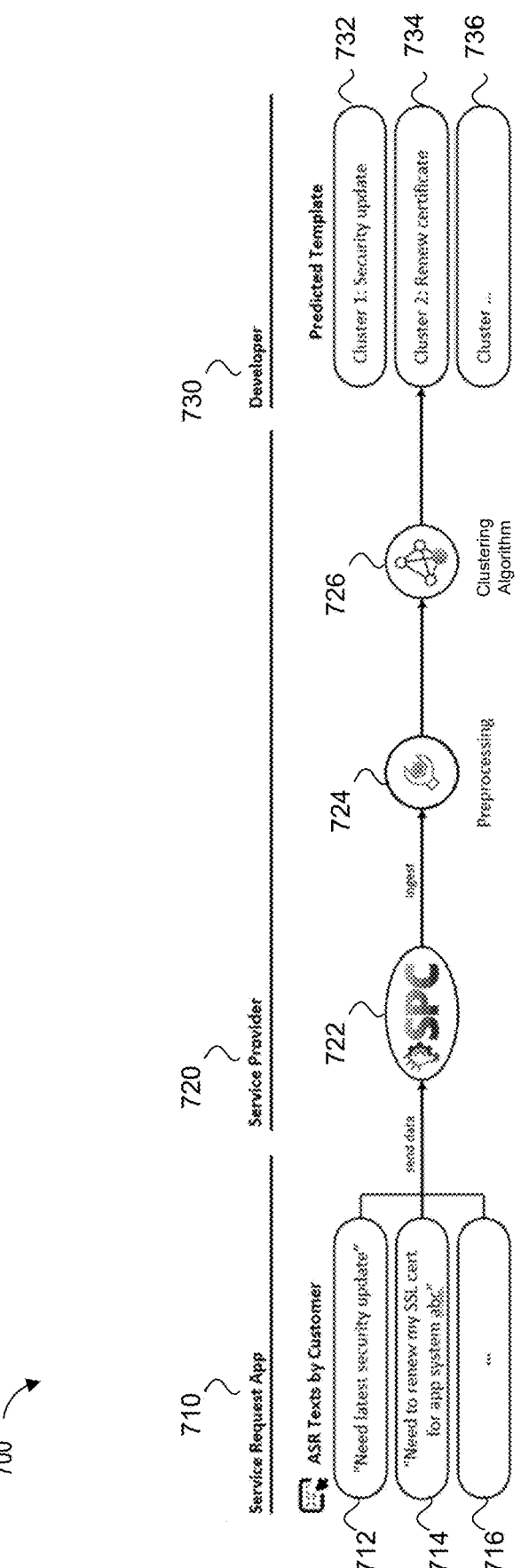
FIG. 7 illustrates a workflow for generating clusters of assisted service requests according to some embodiments.

FIG. 7 illustrates a workflow for generating clusters of assisted service requests according to some embodiments. As shown, workflow 700 starts with service request application 710 generating assisted service requests 712, 714, and

716. While one service request application is shown, it is to be understood that the assisted service requests may come from multiple service request applications running on the devices of multiple users.

Service provider 720 begins with SPC 722 receiving the assisted service requests from one or more service request applications. SPC 722 may collect the assisted service requests and then pass them to preprocessing 724. Preprocessing 724 can include extracting attributes and data from each assisted service request. The extracted attributes and data can then be used to generate a multi-dimensional vector representation for each assisted service request. In one embodiment, the multi-dimensional vector representation can be generated from text describing the assisted service request. Once preprocessing 724 has been completed, clustering algorithm 726 may be applied. Clustering algorithm may organize the assisted service requests into clusters so that similar assisted service requests are in the same cluster. The assisted service requested may be grouped based on semantic similarity of the text and/or syntactic similarity of the text. Semantic similarity refers to the degree of overlap or resemblance in meaning between two pieces of text, phrases, or sentences. Syntactic similarity refers to the degree of similarity between two texts by comparing the structure and grammar of the sentences.

In one embodiment, the number of clusters generated may depend on the number of assisted service requests that have been received by the clustering algorithm. For example, if there are 10 thousand assisted service requests, then clustering algorithm may generate 30 clusters, plus or minus 10 (i.e., 20-40 clusters). In another embodiment, computed statistical metrics such as Silhouette Score, Davies-Bouldin Index, and Calinksi-Harabasz score may be utilized to analyze the assisted service requests to obtain the optimal number of clusters. In one embodiment, service provider 720 may also utilize generative AI models to generate titles and descriptions for each cluster. A generative AI model can receive the titles and descriptions of the assisted service requests in the cluster and generate a title and description for the cluster. The name and description of the cluster may be a name and description that accurately describes the assisted service requests within that cluster. In some examples, generative AI models such as Bert and ChatGPT-like tools. Once clusters have been generated, they may be shared with developer 730. Developer 730 may evaluate the clusters and decide best next steps, whether it be to develop new service request templates or promote existing service request templates. As shown here, clusters 732, 734, and 736 have been shared with developer 730. In some embodiments, the clusters may be shared with the developer through a dashboard.

FIG. 8 illustrates a dashboard illustrating a visual representation of clusters according to some embodiments. As shown here, dashboard 800 includes a plurality of rectangular boxes where each box represents a cluster. The plurality of rectangular boxes make up a larger rectangular box. For a given rectangular box from the plurality of rectangular boxes, the size of the rectangular box indicates the number of assisted service requests within the cluster. Larger boxes may indicate that the cluster includes more assisted service requests. For example, the cluster "Make changes to a file system" that is represented by the rectangular box in the top left corner has more assisted service requests than the cluster "Disable fast restart/Disable SAP" that is represented by the smaller rectangular box on the top right corner. By providing a visual representation in an easy to digest manner, a person viewing dashboard 800 can quickly comprehend how the assisted service requests are distributed across the different clusters, where clusters represented by a larger box contain more assisted service requests and similarly, clusters having a smaller box contain fewer assisted service requests.

FIG. 9 illustrates a workflow for providing service request template recommendations according to some embodiments. Workflow 900 may be implemented as part of a software program that is stored in computer-readable medium to be executed by a processor. As shown, workflow 900 begins by receiving an assisted service request containing text in natural language at step 910. The assisted service request may describe a customer service request associated with a cloud service. In one example, the assisted service request may be received from a customer of the cloud service and may be to request a cloud service that the customer believes is not within a service catalog belonging to the service provider. Field 530 of FIG. 5 is one example of text from the assisted service request.

Workflow 900 may then continue by generating a vector representation from the text at step 920. The vector representation may be generated by applying a word embedding technique to the assisted service request. The word embedding technique may be applied to the description field of the assisted service request, or a concatenation of multiple data fields of the assisted service request. Once the vector representation is generated, workflow 900 continues by performing a similarity search on the vector representation in a vector database. The similarity search may locate entries in the vector database that are similar to the vector representation of the assisted service request. The vector database may contain a vectorized representation of a service catalog containing service request templates that are supported by the service provider. Each service request template from the service catalog may be represented as a vector in the vector database. Thus, a similarity search on the vector database may return entries from the vector database that are most similar to the vector representation of the assisted service request. The similarity of the vector representation to an entry in the vector database may be measured by calculating the difference between the two vectors. Two vectors with a smaller difference are more similar while two vectors with a larger difference are less similar. In one embodiment, the absolute value of the difference can be used to measure similarity. Depending on the implementation details, the number of vectors returned from the vector database may depend on one or more factors. For example, the similarity search may return a predefined number of entries that are closest to the vector representation of the assisted service request. The differences calculated may be sorted and a predefined number of entries with the highest similarity (i.e., smallest difference) may be returned. As another example, the similarity search may return all entries in the vector database that have a predefined similarity threshold to the vector representation of the assisted service request. Entries with a difference value smaller than the predefined threshold may be returned. If there are no entries with a difference value smaller than the predefined threshold, then no entries are returned. In one example, a similarity score is generated. The similarity score may be inversely proportional to the difference value where lower difference values mean a higher similarity score and high difference values mean a low similarity score.

Workflow 900 may then continue by presenting the at least one service request template as a suggestion for the assisted service request at step 940. In one example, the service request template may be presented in a pop up window. In another example, multiple assisted service requests may be presented in separate windows simultaneously so that the user can review different options at the same time. An icon can be configured to indicate the service request template with the higher similarity score, such as an icon with the text "best match."

FIG. 10 illustrates a workflow for clustering assisted service requests according to some embodiments. Workflow 1000 may be implemented as part of a software program that is stored in computer-readable medium to be executed by a processor. As shown, workflow 1000 begins by receiving a plurality of assisted service requests containing text description in natural language at step 1010. The plurality of assisted service requests may include all assisted service requests received or may include a subset of all assisted service requests received. For example, the subset may be the assisted service requests yet to be processed using a service request template from the service catalog. Workflow 1000 continues by generating a vector representation for each of the plurality of assisted service requests at 1020. In one embodiment, the vector representation may be generated by using word embedding technique to generate a multi-dimensional vector from a collection of text. The collection can be the description of the assisted service request, or a combination of the description and other information belonging to the assisted service request, such as the title, summary, or other details of the assisted service request.

Workflow 1000 continues by organizing the plurality of assisted service requests into a plurality of clusters at step 1030. The assisted service requests may be organized into clusters according to their corresponding vector representations that were generated in the previous step. In one embodiment, vector representations that are close to one another may be grouped in the same cluster. The number of clusters that are created may be dependent on the total number of assisted service requests that are being organized. For example, more clusters may be created when there are more assisted service requests being organized. In some embodiments, a clustering algorithm such as k-means clustering may be applied. In some embodiments, generative AI techniques may be applied once the clusters have been formed to generate metadata for each cluster. The metadata can include a title for the cluster, a description for the cluster, and other metadata such as class, type, etc. The generative AI tool may analyze the assisted service requests assigned to the cluster to generate the new metadata.

Workflow 1000 continues by presenting the plurality of clusters at 1040. In one embodiment, the plurality of clusters may be presented as separate lists where each list is associated with a cluster. For example, a list may include a title for the cluster, followed by a list of the assisted service requests associated with a cluster. In another embodiment, the plurality of clusters may be presented graphically as a collection of shapes. For example, each cluster may be presented as a rectangle where the size of the rectangle corresponds with the number of assisted service requests assigned to the cluster. Larger rectangles may correspond to clusters having a larger number of assisted service requests. In one example, the rectangles may come together to form a larger rectangular box. A user reviewing the rectangle may quickly determine which cluster should be developed into a service request template. In some embodiments, the plurality of clusters may be transmitted to another device to be presented to the user.

Figure 11:
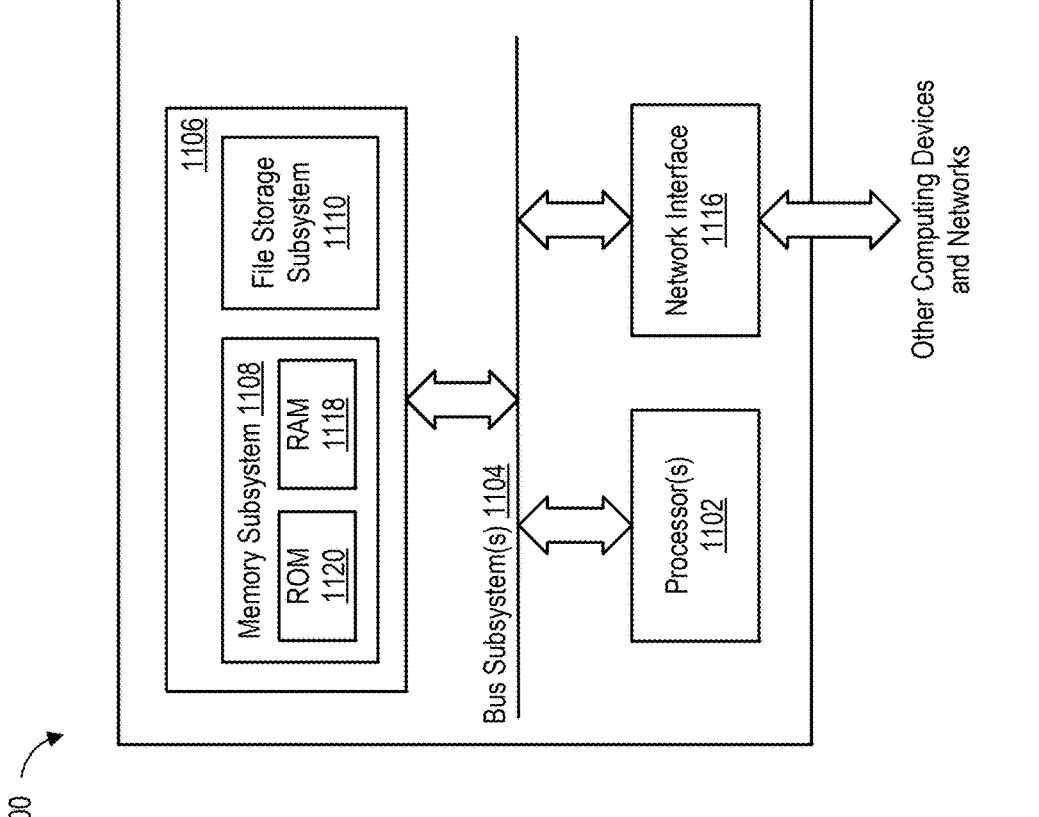
FIG. 11 depicts a simplified block diagram of an example computer system, which can be used to implement some of the techniques described in the foregoing disclosure.

FIG. 11 depicts a simplified block diagram of an example computer system, which can be used to implement some of the techniques described in the foregoing disclosure. As shown in FIG. 11, system 1100 includes one or more processors 1102 that communicate with several devices via one or more bus subsystems 1104. These devices may include a storage subsystem 1106 (e.g., comprising a memory subsystem 1108 and a file storage subsystem 1110) and a network interface subsystem 1116. Some systems may further include user interface input devices and/or user interface output devices (not shown).

Bus subsystem 1104 can provide a mechanism for letting the various components and subsystems of system 1100 communicate with each other as intended. Although bus subsystem 1104 is shown schematically as a single bus, alternative embodiments of the bus subsystem can utilize multiple buses.

Network interface subsystem 1116 can serve as an interface for communicating data between system 1100 and other computer systems or networks. Embodiments of network interface subsystem 1116 can include, e.g., Ethernet, a Wi-Fi and/or cellular adapter, a modem (telephone, satellite, cable, etc.), and/or the like.

Storage subsystem 1106 includes a memory subsystem 1108 and a file/disk storage subsystem 1110. Subsystems 1108 and 1110 as well as other memories described herein are examples of non-transitory computer-readable storage media that can store executable program code and/or data that provide the functionality of embodiments of the present disclosure.

Memory subsystem 1108 comprise one or more memories including a main random access memory (RAM) 1118 for storage of instructions and data during program execution and a read-only memory (ROM) 1120 in which fixed instructions are stored. File storage subsystem 1110 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 1100 is illustrative and many other configurations having more or fewer components than system 1100 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method, comprising: receiving an assisted service request containing text in natural language, wherein the text describes a customer service request associated with a cloud service, generating a vector representation from the text, performing a similarity search on the vector representation in a vector database, wherein the similarity search returns at least one vector, retrieving at least one service request template corresponding to the at least one vector, and presenting the at least one service request template as a suggestion for the assisted service request.

In one embodiment, the vector database is based on a plurality of software request templates in a service catalog.

In one embodiment, each software request template in the plurality of software request templates includes a description in natural language text describing the corresponding software request template and the vector database is generated from applying a word embedding technique to the description of the plurality of software request templates.

In one embodiment, generating the vector representation from the text includes applying a word embedding technique to the text.

In one embodiment, the at least one service request template is presented as a suggestion in a pop up window.

In one embodiment, a first service request template is presented in a first window and a second service request template is presented in a second window.

In one embodiment, the first window includes an icon configured to indicate that the first service request template has a higher similarity score than the second service request template.

In some embodiments, a system comprises one or more processors; a non-transitory computer-readable medium storing a program executable by the one or more processors, the program comprising sets of instructions for: receiving an assisted service request containing text in natural language, wherein the text describes a customer service request associated with a cloud service, generating a vector representation from the text, performing a similarity search on the vector representation in a vector database, wherein the similarity search returns at least one vector, retrieving at least one service request template corresponding to the at least one vector, and presenting the at least one service request template as a suggestion for the assisted service request.

In some embodiments, a non-transitory computer-readable medium stores a program executable by one or more processors, the program comprising sets of instructions for comprising: receiving an assisted service request containing text in natural language, wherein the text describes a customer service request associated with a cloud service, generating a vector representation from the text, performing a similarity search on the vector representation in a vector database, wherein the similarity search returns at least one vector, retrieving at least one service request template corresponding to the at least one vector, and presenting the at least one service request template as a suggestion for the assisted service request.

What is claimed is:

1. A method, comprising:
   applying a plurality of service request templates of a service catalog to a large language embedding model to generate a vector database;
   receiving an assisted service request containing text in natural language, wherein the text describes a customer service request associated with a cloud service;
   applying the text contained in the assisted service request to the large language embedding model to generate a vector representation from the text;
   performing a similarity search on the vector representation in the vector database, wherein the similarity search returns at least one vector;

retrieving, based on the at least one vector returned by the similarity search, at least one service request template from the plurality of service request templates of the service catalog; and presenting the at least one service request template as a suggestion for the assisted service request.

2. The method as in claim 1, wherein the vector database is based on a plurality of software request templates in the service catalog.

3. The method as in claim 2, wherein each software request template in the plurality of software request templates includes a description in natural language text describing the corresponding software request template and the vector database is generated from applying a word embedding technique to the description of the plurality of software request templates.

4. The method as in claim 1, wherein generating the vector representation from the text includes applying a word embedding technique to the text.

5. The method as in claim 1, wherein the at least one service request template is presented as a suggestion in a pop up window.

6. The method as in claim 1, wherein a first service request template is presented in a first window and a second service request template is presented in a second window.

7. The method as in claim 6, wherein the first window includes an icon configured to indicate that the first service request template has a higher similarity score than the second service request template.

8. A system comprising:

one or more processors;

a non-transitory computer-readable medium storing a program executable by the one or more processors, the program comprising sets of instructions for:

applying a plurality of service request templates of a service catalog to a large language embedding model to generate a vector database;

receiving an assisted service request containing text in natural language, wherein the text describes a customer service request associated with a cloud service;

applying the text contained in the assisted service request to the large language embedding model to generate a vector representation from the text;

performing a similarity search on the vector representation in the vector database, wherein the similarity search returns at least one vector;

retrieving, based on the at least one vector returned by the similarity search, at least one service request template from the plurality of service request templates of the service catalog; and presenting the at least one service request template as a suggestion for the assisted service request.

9. The system of claim 8, wherein the vector database is based on a plurality of software request templates in the service catalog.

10. The system of claim 9, wherein each software request template in the plurality of software request templates includes a description in natural language text describing the corresponding software request template and the vector database is generated from applying a word embedding technique to the description of the plurality of software request templates.

11. The system of claim 8, wherein generating the vector representation from the text includes applying a word embedding technique to the text.

12. The system of claim 8, wherein the at least one service request template is presented as a suggestion in a pop up window.

13. The system of claim 8, wherein a first service request template is presented in a first window and a second service request template is presented in a second window.

14. The system of claim 13, wherein the first window includes an icon configured to indicate that the first service request template has a higher similarity score than the second service request template.

15. A non-transitory computer-readable medium storing a program executable by one or more processors, the program comprising sets of instructions for:

applying a plurality of service request templates of a service catalog to a large language embedding model to generate a vector database;

receiving an assisted service request containing text in natural language, wherein the text describes a customer service request associated with a cloud service;

applying the text contained in the assisted service request to the large language embedding model to generate a vector representation from the text;

performing a similarity search on the vector representation in the vector database, wherein the similarity search returns at least one vector;

retrieving, based on the at least one vector returned by the similarity search, at least one service request template from the plurality of service request templates of the service catalog; and presenting the at least one service request template as a suggestion for the assisted service request.

16. The non-transitory computer-readable medium of claim 15, wherein the vector database is based on a plurality of software request templates in the service catalog.

17. The non-transitory computer-readable medium of claim 16, wherein each software request template in the plurality of software request templates includes a description in natural language text describing the corresponding software request template and the vector database is generated from applying a word embedding technique to the description of the plurality of software request template.

18. The non-transitory computer-readable medium of claim 15, wherein generating the vector representation from the text includes applying a word embedding technique to the text.

19. The non-transitory computer-readable medium of claim 15, wherein a first service request template is presented in a first window and a second service request template is presented in a second window.

20. The non-transitory computer-readable medium of claim 19, wherein the first window includes an icon configured to indicate that the first service request template has a higher similarity score than the second service request template.

\* \* \* \* \*